United States Patent

[11] 3,568,590

[72] Inventor James L. Grice
825 Parkrose Ave., Memphis, Tenn. 38109
[21] Appl. No. 804,787
[22] Filed Mar. 6, 1969
[45] Patented Mar. 9, 1971

[54] COOKING STOVE
11 Claims, 3 Drawing Figs.

[52] U.S. Cl. .................................................. 99/446,
99/447, 99/450, 126/25
[51] Int. Cl. ............................................. A47j 27/00
[50] Field of Search ........................................... 99/446,
447, 445, 444; 126/19, 25; 99/375, 400, 408, 425,
339

[56] References Cited
UNITED STATES PATENTS
1,189,818 7/1916 Holloway ..................... 126/19X

| | | | |
|---|---|---|---|
| 2,143,999 | 1/1939 | Rosson ......................... | (99/447)UX |
| 2,350,948 | 6/1944 | Walker ......................... | 126/25 |
| 3,477,360 | 11/1969 | Raney ......................... | 99/446X |

Primary Examiner—Walter A. Scheel
Assistant Examiner—Arthur O. Henderson
Attorney—John R. Walker, III ABSTRACT: A cooking stove including firebox structure adapted to contain charcoal or like fuel and including horizontal baffle means arranged directly over the firebox and including horizontal grill-like food rack structure arranged directly over the baffle structure. The arrangement being operative for causing combustion heat and gases of the burning charcoal fuel to flow rearwardly underneath the baffle structure and then forwardly and upwardly superjacently of the baffle structure and through the grill-like food rack. The food supported on the rack is arranged in the flow of combustion gases and is not subjected to radiant heat from the fuel.

Patented March 9, 1971

3,568,590

INVENTOR.
JAMES L. GRICE
BY John R. Walker, III
Attorney

COOKING STOVE

BACKGROUND OF THE INVENTION

1. Field of the Invention

The invention relates to food cooking devices generally and relates to substantially small cooking stove devices particularly adapted for cooking meat and to barbecue-type food preparation.

2. Description of the Prior Art

Heretofore, small cooking stove devices adapted for barbecue- or grill-type cooking have generally been adapted for cooking the meat in direct heat from the charcoal or other such fuel. Generally, such prior art devices do not include effective draft control means for controlling the burning rate of the charcoal fuel and the meat or food items are prepared generally over an open fire. In the prior art barbecue-type cooking devices, the ambient air currents and lack of draft control or control of air circulation in a cooking stove resulted in improper control of the heat and burning of the charcoal fuel and waste of fuel. Moreover, in typical prior art barbecue stove or grill devices, the meat is cooked by direct heat and radiation of the fuel and is cooked substantially on the underside only of the meat or food item. In cooking or preparing a cut of meat in prior art barbecue cooking devices, the cook or attendant of the device must repeatedly turn the food item over to expose the underside thereof to the cooking heat. Such cooking procedure is somewhat slow and necessitates substantially constant attendance by the one preparing the food. In addition, heretofore there has been the problem of the grease from the meat dripping on the charcoal, causing the fire to flare up. Many times this flaring up of the fire caused the meat to burn or if water was thrown on the fire, it resulted in steam and an undesirable moistening of the meat or soot substances being deposited on the meat.

SUMMARY OF THE INVENTION

The cooking stove structure of the present invention cooks a meat portion or other food item without exposure to direct heat or radiation from the burning fuel material. The cooking stove incorporates certain desirable features of dry cooking or oven cooking-type food preparation while yet retaining certain desirable features of wet-type or open barbecue-type food cooking. In the present stove device, the meat or food is suspended or supported in the upward flow of combustion gases from the burning fuel but is not subjected to direct radiation from the fuel. The present stove device cooks a cut of meat simultaneously on both sides thereof which substantially reduces the cooking time as compared with prior art barbecue-type food preparation which cooks the food substantially only on the underside. The cooking meat and burning fuel is substantially shielded at all times from ambient air currents and heat loss and thereby affords effective control of the meat cooking process. The cooking stove unit of the invention may be initially adjusted to a desired heat range and then left unattended for a certain interval of cooking time while the meat or food is being prepared; the cooking process need not be watched or attended during the cooking of the food item and may be prepared in much the same manner as dry heat cooking or oven cooking. The enclosed cooking structure of the present invention reduces also the waste of charcoal fuel and may prepare or cook the food by use of less charcoal material than required in prior art stove structures. Also, the liquid fat drippings from the cooking meat does not drop into the charcoal and produce "flare-ups" and charcoal soot substances on the meat and in the smoke. This facilitates more uniform cooking of the meat and meat cooked without charcoal substances resulting from burned liquid fat drippings. Meat items prepared by the cooking stove of the present invention are tender, tasty and with a desired charcoal flavor.

DESCRIPTION OF THE PREFERRED EMBODIMENT

Figure 1:
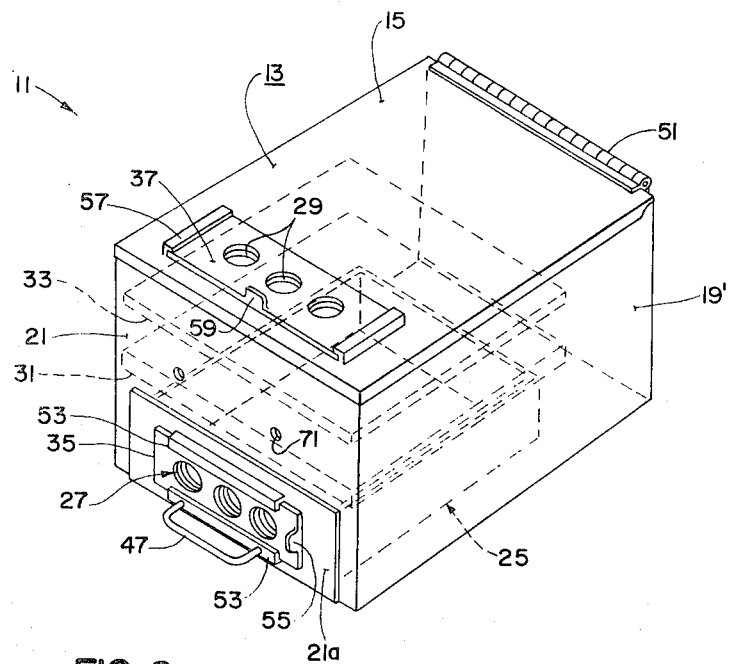
FIG. 1 is a perspective view of the cooking stove of the present invention.

The cooking stove of the present invention, indicated by numeral 11, basically includes a boxlike housing 13 including top, bottom, left and right wall structure 15, 17, 19, 19' respectively and front and rear wall structure 21, 23; firebox means preferably in the form of a drawerlike firebox assembly 25; draft passageway means for passage of air through the interior of housing 13 including inlet apertures 27 arranged in the lower forward portion of housing 13, outlet apertures 29 arranged in the upper forward portion of housing structure 13, and a generally horizontally configured baffle assembly 13, and a generally horizontally configured baffle assembly 31; and includes food rack structure 33 for supporting the cooking food items. The stove structure also preferably includes inlet and outlet damper valve members 35, 37 adjustably fitted respectively across inlet and outlet apertures 27, 29; and preferably includes means for catching, and conducting liquid fat food droppings to the exterior of stove housing 13 including a drip sheet 39 arranged underneath food rack structure 33.

Cooking stove 11, in its preferred form, is adapted for utilizing charcoal material (indicated C) and preferably includes firebox assembly 25 for removably holding the charcoal material C during combustion thereof. Firebox assembly 25 preferably includes vertical front wall structure 21a forming respectively part of stove housing front wall means 21; and includes rear wall and bottom wall structure 41, 43 and sidewalls 45, 45'. Firebox assembly 25 preferably is slidably fitted through a generally rectangular firebox aperture formed respectively in the lower part of housing front wall structure 21 and with firebox bottom wall 43 slidably restingly supported on housing bottom wall 17. A U-shaped handle 47 fixed on the lower forward portion of firebox front wall 21a provides handgrip means for slidably moving firebox assembly 25 inwardly and outwardly of stove structure 13 (see broken line illustration of firebox 25 in FIG. 2).

Food rack 33 preferably is formed of heavy duty hardware mesh material and is preferably removably restingly fitted on support tabs 49, 49' fixed oppositely respectively on stove housing sidewalls 19, 19'. Food rack 33 is arranged directly over baffle assembly 31 and at an intermediate level between the baffle assembly and housing top wall structure 15. The rack 33 is adapted to support a food item such as the cut of meat indicated M in FIG. 2.

Figure 2:
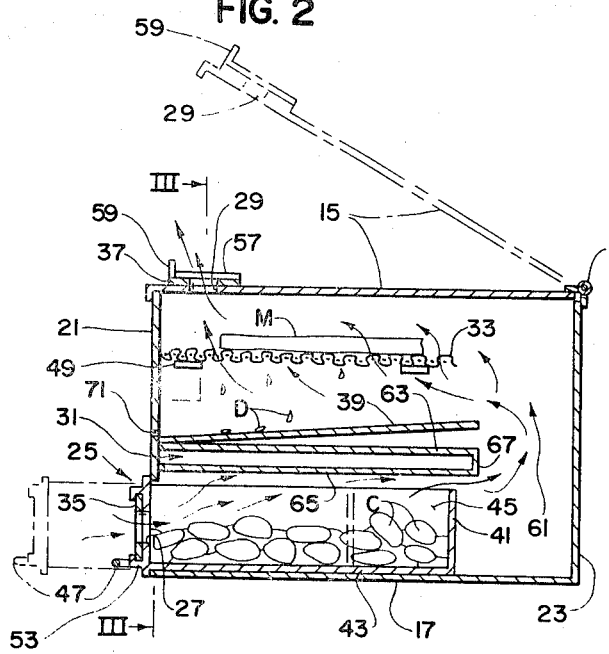
FIG. 2 is a longitudinal vertical plane sectional view of the stove structure.

Housing top wall 15 preferably is hingedly supported from the remainder of the stove housing structure and is adapted for pivotal displacement upwardly for access to the interior of the housing (see broken line showing of open disposition of housing top wall in FIG. 2). Horizontal hinge means 51 hingedly connects the rearward edge of housing top wall 15 to the upper edge of housing rear wall 23. Although the housing structure of the cooking stove may be provided with displaceable wall means other than that shown and described, in the preferred embodiment, access to the interior of the housing is by door means constituted by hingedly displaceable top wall 15 of the stove housing. The outlet aperture 29 also is preferably formed in the hingedly displaceable top wall structure 15 of the housing: although inlet and outlet apertures 27, 29 may be arranged in other forward stationary sections of the stove housing, the preferred arrangement is that illustrated and with the inlet and outlet apertures arranged in the displaceable housing top and firebox structures 15, 21a.

Inlet damper valve 35 is platelike and is provided with a plurality of draft inlet apertures corresponding in size and spacing with the inlet apertures 27 of firebox assembly front wall 21a. Opposingly arranged guide channels 53, 53 fixedly secured in parallel spaced arrangement on firebox front wall 21a guidingly constrains inlet damper valve 35 in horizontal bidirectional movement. Tab handle 55 fixed on damper valve 35 provides fingergrip means for horizontal sliding manipulation of the damper valve and selective adjustment of fresh air flow through inlet apertures 27. In like manner, parallel arranged guide channels 57, 57 fixed in opposing arrangement respectively on the the forward section of housing top wall 15 guidingly constrains outlet damper valve 37 in selective bidirectional movement. Tab handle 59 fixed on the forward center edge portion of damper valve 37 provides fingergrip means for forward and rearward manipulation of the damper valve and selective adjustment of combustion air flow through outlet apertures 29. Fingergrip tab 59 of damper valve 37 also preferably provides handle means for hingedly raising and lowering housing top wall 15 in gaining access to the stove interior.

Baffle assembly 31 preferably is thick, hollow, slablike in configuration and horizontally fixedly secured in stove housing structure 13 at a disposition directly over firebox assembly 25. The left, right and forward marginal portions of baffle assembly 31 preferably sealingly engages respectively the left, right and front walls 19, 19', 21 of the stove housing. The rearward extremity of baffle assembly 31 is horizontally spaced from housing rear wall 23 and defines a vertical flue passageway 61 (see FIG. 2).

Baffle assembly 31 preferably includes parallel vertically spaced apart upper and lower horizontal platelike members 63, 65, and a vertical edge member 67 integrally connecting respectively the rearward edge portions of baffle members 63, 65. The hollow baffle assembly 63 defines dead air space 69 constituting heat insulating means for inhibiting heat transfer between lower horizontal baffle member 65 and upper horizontal baffle member 63. It will be understood that in certain embodiments of the invention it may be desirable to form baffle assembly 31 of other construction than that shown and described. Thus, in certain embodiments of the invention it may be desirable to form the baffle 31 of solid construction and of material exhibiting desired heat insulating qualities (not shown). However, the baffle assembly is preferably formed as shown and of hollow construction, and with the hollow dead air space interior 69 constituting the heat insulating means and for inhibiting heat transfer from the undersurface structure of baffle member 65 to the upper surface structure of baffle member 63.

Figure 3:
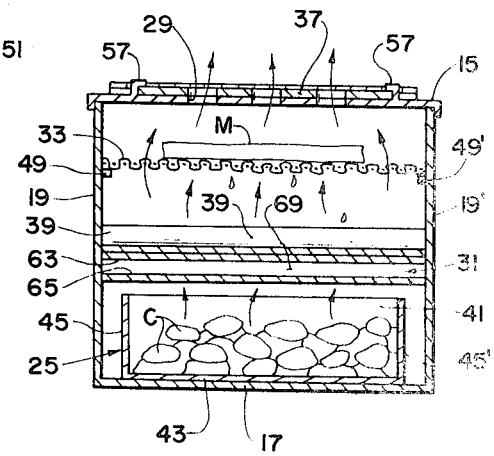
FIG. 3 is a transverse broken vertical plane sectional view taken as on the line III—III of FIG. 2.

Cooking stove 11 also preferably includes means for catching liquid fat drippings (indicated D in FIG. 2) dropping from meat M and for conducting the liquid fat to the exterior of the cooking stove housing: small drip apertures 71 formed in stove housing front wall 21 provides outlet means for conducting liquid fat drippings D to the exterior of the stove. The drip sheet 39 is arranged directly subjacently of food rack 33 and preferably extends fully transversely across stove housing 13. Drip sheet 39 is inclined forwardly and downwardly with its forward edge being sealingly engaged with the interior surface of housing front wall 21 at a disposition slightly subjacently of drip apertures 71. Liquid fat drippings D oozing from a cooking food item M is caught by drip sheet 39 and conducted downwardly and through drip apertures 71. The arrows in FIGS. 2 and 3 indicate the flow of air and combustion gases through the cooking stove.

I claim:

1. A cooking stove comprising housing means defining an interior of the stove, draft passageway means for passage of air, smoke, and heat through the interior of said housing means including structure defining an inlet aperture in the lower portion of said housing means and structure defining an outlet aperture in the upper portion of said housing means, fire chamber means in said draft passageway means to receive a quantity of fuel material in combustion, openwork food rack means in said draft passageway adapted to support cooking food items, and baffle means in said housing means in direct alignment between said food rack means and said fire chamber means for preventing direct radiation of heat from said fire chamber means to said food rack means and food items supported thereon and limiting the heat transfer from said fire chamber to said food rack means and food items supported thereon substantially to that transferred with the air and smoke through said draft passageway means, said rack means being horizontally disposed in spaced relationship directly over said baffle means and intermediately of said baffle means and the upper portion of said housing means.

2. A cooking stove comprising housing means defining substantially a fully enclosed interior of the stove and including top and bottom walls, left, right, front and rear walls, fire chamber means arranged in the interior lower level of said housing structure adapted to receive a quantity of fuel material in combustion, draft passageway means for passage of air through the interior of said housing means including structure defining an inlet aperture arranged in the lower forward portion of said housing means, an outlet aperture arranged in the upper forward portion of said housing means, and imperforate generally horizontal baffle means arranged substantially directly over said fire chamber means in spaced relationship therewith and having left, right and forward marginal portions generally sealingly engaging respectively said left, right and front walls of said housing means and having a rearward edge portion spaced from said housing rear wall and defining generally a vertical flue passageway in the rearward interior of said housing means, and including openwork food rack means adapted to support cooking food items, said rack means being arranged directly over said baffle means and intermediately of said baffle means and said housing top wall, said housing means including door means for affording access to the food items supported on said food rack means.

3. The stove structure as defined in claim 2 wherein said fire chamber means is generally in the form of a shallow drawer-like firebox having a bottom wall, a front wall, and left and right sidewalls, and wherein said stove housing means includes a firebox aperture of a size adapted to freely snugly receive in horizontal linear movement said firebox.

4. The stove structure as defined in claim 3 which additionally includes selectively adjustable inlet damper valve means including a damper valve member selectively arrangeable across said inlet aperture of said stove housing means.

5. The stove structure as defined in claim 2 which additionally includes selectively adjustable outlet damper valve means including a damper valve member selectively arrangeable across said outlet aperture of said stove housing means.

6. The stove structure as defined in claim 2 wherein said top wall of said stove housing means is selectively displaceable relative to the remainder of said housing means thereby constituting the door means of said stove structure.

7. The stove structure as defined in claim 6 wherein said outlet aperture is formed in said housing top wall and which additionally includes selectively adjustable outlet damper valve means including a damper valve member selectively arrangeable across said outlet aperture of said stove housing top wall.

8. The stove structure as defined in claim 2 which additionally includes means for catching liquid drippings dropping from the food rack-supported food items and for conducting the liquid drippings to the exterior of the cooking stove housing means.

9. The stove structure as defined in claim 8 wherein said means for catching and conducting the liquid drippings from the food items include at least one small drip aperture formed in the front wall of said housing means and includes an inclined drip sheet arranged directly subjacently of said food rack means and inclined forwardly and downwardly and including means for conducting liquid drippings from the lower portions of said drip sheet to and through said drip aperture.

10. The stove structure as defined in claim 2 wherein said baffle means is generally thick and slablike in outline configuration and includes upper surface structure and lower surface structure in spaced apart arrangement, and includes heat insulating means for inhibiting heat transfer between said lower surface structure and said upper surface structure.

11. The stove structure as defined in claim 10 wherein said baffle means generally is in the form of a hollow baffle assembly including a vertically spaced apart parallel pair of sheetlike horizontal baffle members including an upper baffle member defining said upper surface structure and a lower baffle member defining said lower surface structure, and wherein the space between said upper and lower baffle members is substantially free of structure.